US011949652B2

(12) United States Patent
Suh et al.

(10) Patent No.: US 11,949,652 B2
(45) Date of Patent: Apr. 2, 2024

(54) TRANSMITTING ROUTER ADVERTISEMENTS BASED ON IDENTIFICATION INFORMATION OF EXTERNAL DEVICES

(71) Applicant: Samsung Electronics Co., Ltd., Gyeonggi-do (KR)

(72) Inventors: Sungki Suh, Gyeonggi-do (KR); Hyunsang Park, Gyeonggi-do (KR); Milim Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/677,220

(22) Filed: Feb. 22, 2022

(65) Prior Publication Data
US 2022/0321524 A1 Oct. 6, 2022

Related U.S. Application Data

(63) Continuation of application No. PCT/KR2022/000851, filed on Jan. 17, 2022.

(30) Foreign Application Priority Data

Mar. 31, 2021 (KR) .................. 10-2021-0041559

(51) Int. Cl.
*H04L 61/5007* (2022.01)
*H04L 61/5053* (2022.01)
(Continued)

(52) U.S. Cl.
CPC ...... *H04L 61/5007* (2022.05); *H04L 61/5053* (2022.05); *H04L 2101/622* (2022.05); *H04L 2101/659* (2022.05)

(58) Field of Classification Search
CPC ............ H04L 61/5007; H04L 61/5053; H04L 2101/622; H04L 2101/659
(Continued)

(56) References Cited

U.S. PATENT DOCUMENTS 7,418,264 B2    8/2008  Kim
8,315,218 B2 *  11/2012 Kim ................... H04W 36/385
                                                        370/341
(Continued)

FOREIGN PATENT DOCUMENTS

CN    102025608 A    4/2011
JP      4169036 B2   8/2008
(Continued)

OTHER PUBLICATIONS

The American Heritage Dictionary of the English Language 395 (v. def.) (3rd ed. 1992) (Year: 1992).*
International Search Report dated Apr. 27, 2022.

*Primary Examiner* — David P Zarka
(74) *Attorney, Agent, or Firm* — Cha & Reiter, LLC

(57) ABSTRACT

An electronic device and method are disclosed. The electronic device includes memory storing identification of at least an external electronic device, to which an IPv6-based IP address is allocatable, a communication circuit, and a processor. The processor implements the method, including: receiving, from the external electronic device, a router solicitation including a link local address generated by the external electronic device, and identification information of the external electronic device, confirming whether the identification information of the external electronic device included in the router solicitation is stored in the memory, and if so, transmitting a router advertisement including information related to generation of the IP address to the external electronic device.

15 Claims, 12 Drawing Sheets

(51) Int. Cl.
*H04L 101/622* (2022.01)
*H04L 101/659* (2022.01)

(58) Field of Classification Search
USPC .......................................... 709/245
See application file for complete search history.

(56) References Cited

U.S. PATENT DOCUMENTS

| | | | |
|---|---|---|---|
| 8,681,695 B1* | 3/2014 | Krishnan | H04L 61/5014 370/395.54 |
| 9,622,072 B2 | 4/2017 | Wu et al. | |
| 9,992,159 B2 | 6/2018 | Kitamura | |
| 2008/0089258 A1* | 4/2008 | Cheon | H04L 61/5092 370/310 |
| 2008/0107067 A1* | 5/2008 | Baek | H04L 65/80 370/328 |
| 2009/0285215 A1* | 11/2009 | Kaippallimalil | H04L 61/103 370/392 |
| 2011/0219126 A1* | 9/2011 | Aramoto | H04W 8/06 709/228 |
| 2012/0128001 A1* | 5/2012 | Ooghe | H04L 61/5046 370/392 |
| 2013/0215825 A1* | 8/2013 | Hsu | H04W 88/06 370/328 |
| 2013/0243005 A1* | 9/2013 | Miyazaki | H04L 49/253 370/401 |
| 2014/0082158 A1* | 3/2014 | Yin | H04L 41/0826 709/220 |
| 2016/0036768 A1* | 2/2016 | Pratapa | H04L 61/5007 709/245 |
| 2017/0187703 A1 | 6/2017 | Enrique Salpico | |
| 2017/0195162 A1* | 7/2017 | Enrique Salpico | H04L 63/101 |
| 2018/0199243 A1* | 7/2018 | Bharatia | H04W 36/0066 |
| 2018/0329659 A1* | 11/2018 | Matsui | G06F 3/1204 |

FOREIGN PATENT DOCUMENTS

| | | |
|---|---|---|
| KR | 10-0689734 B1 | 3/2007 |
| KR | 10-2008-0041989 A | 5/2008 |
| KR | 10-0933368 B1 | 12/2009 |
| KR | 10-2010-0090981 A | 8/2010 |
| KR | 10-1037477 B1 | 5/2011 |
| KR | 10-1166765 B1 | 7/2012 |
| KR | 10-1291190 B1 | 7/2013 |
| KR | 10-2017-0013298 A | 2/2017 |

* cited by examiner

TRANSMITTING ROUTER ADVERTISEMENTS BASED ON IDENTIFICATION INFORMATION OF EXTERNAL DEVICES

CROSS-REFERENCE TO RELATED APPLICATION(S)

This application is a continuation of International Application No. PCT/KR2022/000851, filed on Jan. 17, 2022 which is based on and claims priority under 35 U.S.C. § 120 to Korean Patent Application No. 10-2021-0041559, filed on Mar. 31, 2021, in the Korean Intellectual Property Office, the disclosures of which are incorporated by reference herein their entirety.

BACKGROUND

Technical Field

Certain embodiments of the disclosure relate to an electronic device and a method for operating an electronic device and, more particularly, to an electronic device for allocating an IP address of an external electronic device.

Description of Related Art

In connection with exchanging data with an external electronic device, an electronic device may use an IP (internet protocol) address allocated to the electronic device so as to exchange data with the external electronic device. When the electronic device transmits or receives data through short-range wireless communication, an IP address allocated through a router connected to the electronic device may be used to transmit or receive data.

The IP address that the router allocates may include a local address that can be used inside a local network including the electronic device and the router, or a global address that may be used to communicate with entities outside the network. The global address may be designated by the communication service provider, and may have a limited number. An entity existing outside the network may use the global address to directly access the electronic device.

An electronic device (for example, router) capable of allocating an IPv6-based IP address may support a bridge mode (e.g., or IP pass-through mode). In the bridge mode, an entity outside a network directly transmits data to an external electronic device connected to an electronic device through a global address (or transmits data without going through a router). An IP address request message (for example, router solicitation message) may be received from the external electronic device, and a response message (for example, router advertising message) including information for IP address generation may be transmitted. The electronic device may transmit a response message to every external electronic device that has transmitted the IP address request message. When transmitting a response message to every external electronic device that has transmitted the IP address request message, a situation may occur in which an unauthorized external electronic device may nevertheless access the bridge mode.

SUMMARY

An electronic device according to certain embodiments of the disclosure may include: a memory configured to store identification information of at least one external electronic device to which an IPv6-based IP address is allocatable, a communication circuit, and a processor, wherein the processor is configured to receive, from the external electronic device, a router solicitation including a link local address generated by the external electronic device, and identification information of the external electronic device, confirm whether the identification information of the external electronic device included in the router solicitation is stored in the memory, and based on the identification information of the external electronic device being stored in the memory, control the communication circuit such that a router advertisement including information related to generation of the IP address is transmitted to the external electronic device.

A method for operating an electronic device according to certain embodiments of the disclosure may include: receiving, from an external electronic device, a router solicitation including a link local address generated by the external electronic device, and identification information of the external electronic device, confirming whether the identification information of the external electronic device included in the router solicitation is stored in a memory, and based on detecting that the identification information of the external electronic device being stored in the memory, transmitting a router advertisement including information related to generation of an IPv6-based IP address to the external electronic device.

DETAILED DESCRIPTION

An electronic device and a method for operating an electronic device according to certain embodiments of the disclosure may determine whether or not to transmit a response message, based on whether identification information of an external electronic device included in an IP address request message is stored in a memory. Therefore, the electronic device may transmit a response message to a designated external electronic device and may transmit no response message to electronic devices other than the designated external electronic device, thereby preventing electronic devices other than the designated external electronic device from using a bridge mode.

Figure 1:
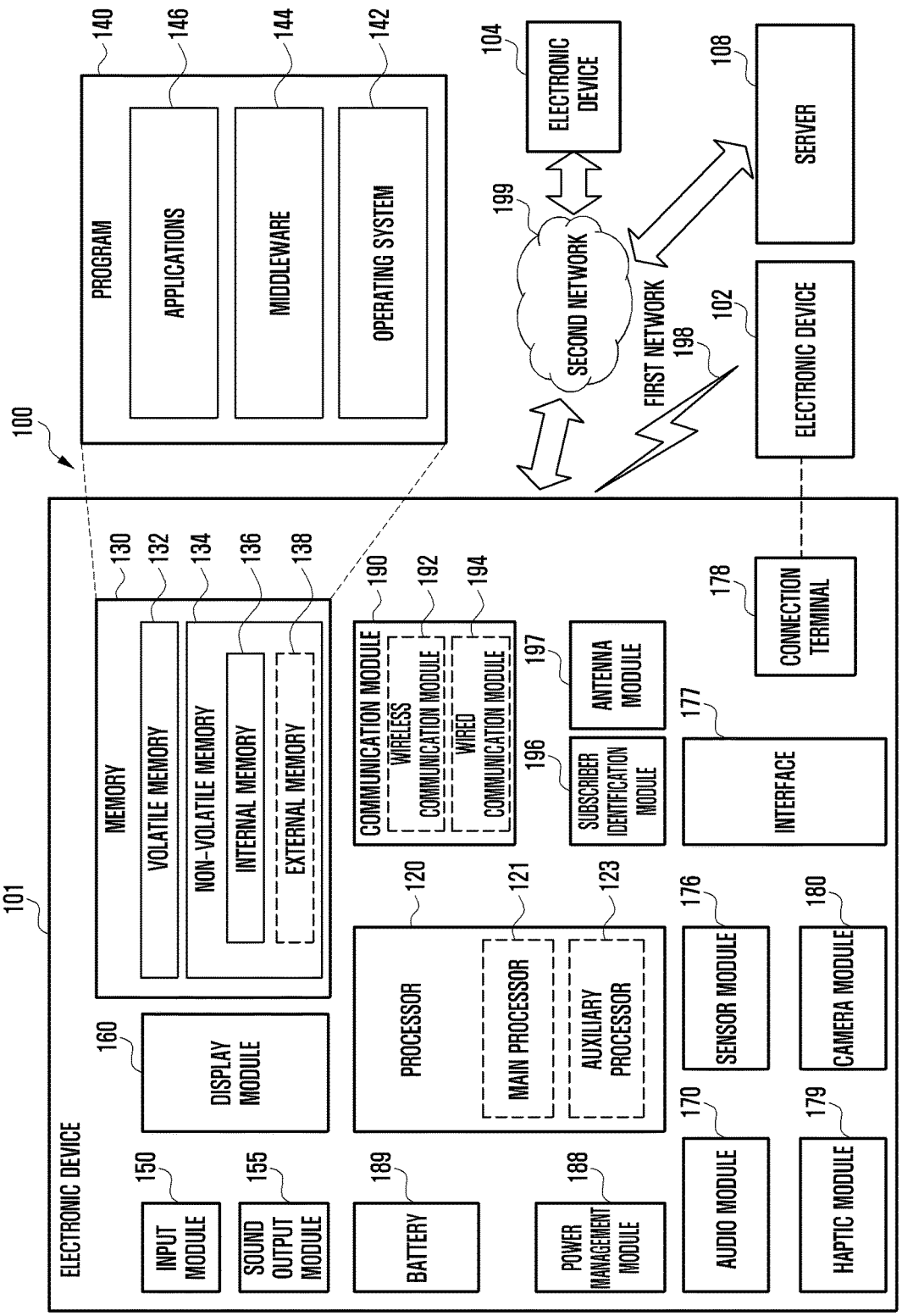
FIG. 1 is a block diagram of an electronic device according to certain embodiments of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11 connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
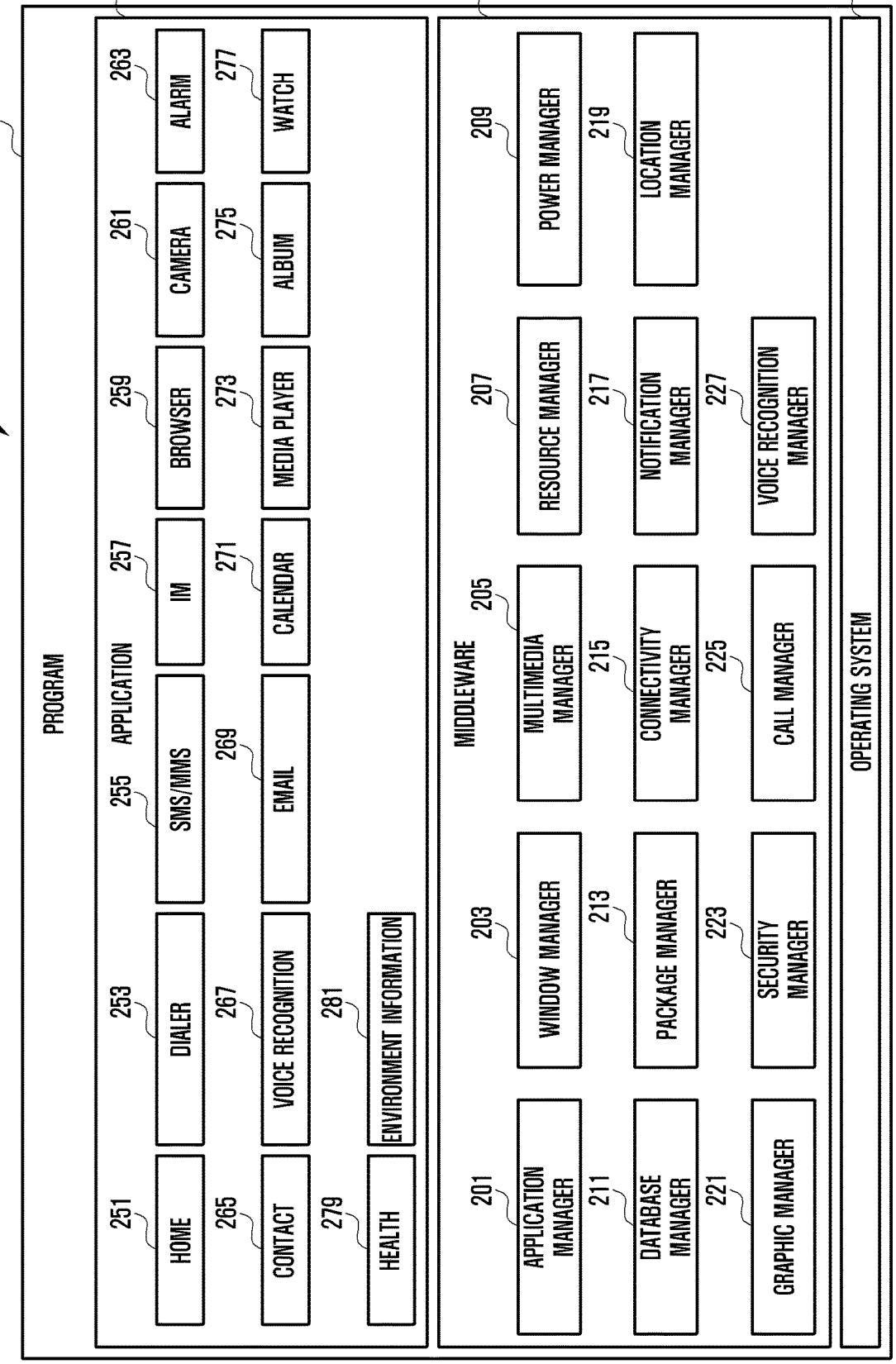
FIG. 2 is a block diagram of a program according to certain embodiments.

FIG. 2 is a block diagram 200 illustrating the program 140 according to certain embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 144 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
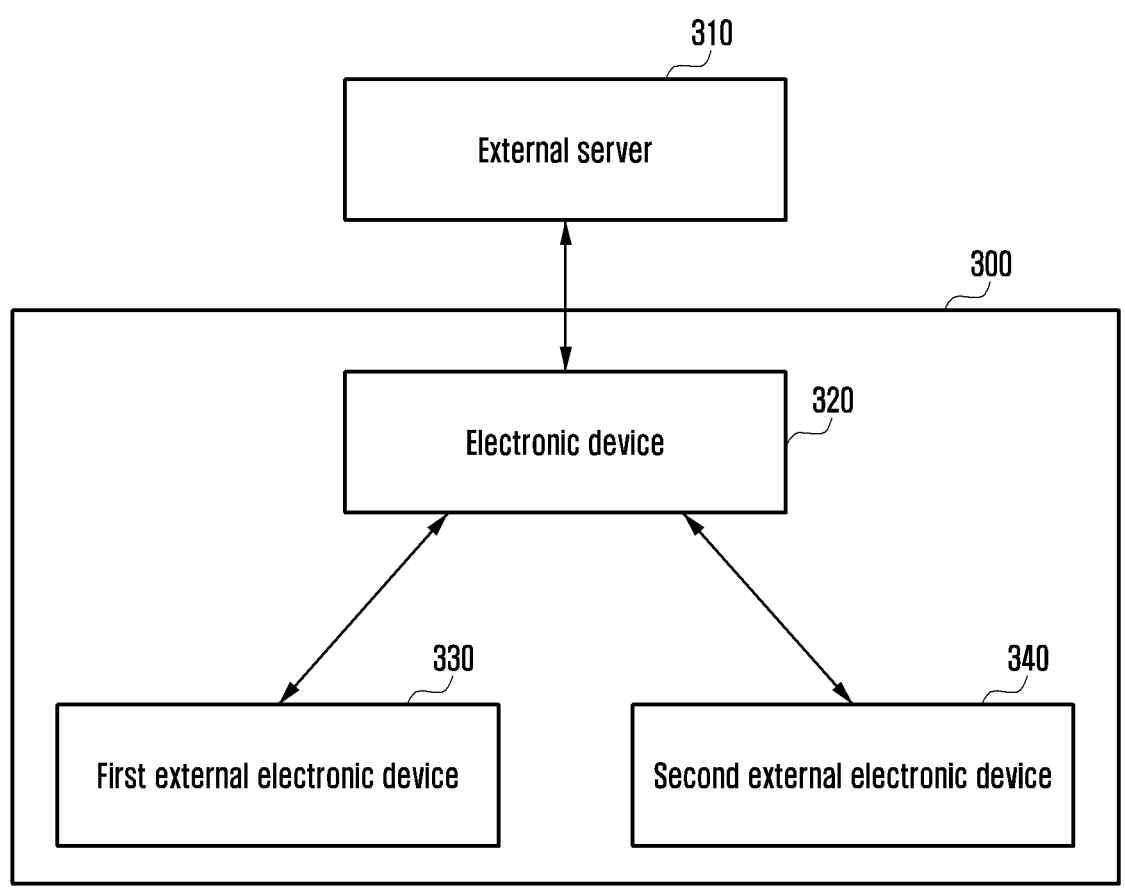
FIG. 3 is a block diagram of a network according to certain embodiments of the disclosure.

FIG. 3 is a block diagram of a network according to certain embodiments.

According to certain embodiments of the disclosure, a network 300 may include an external server 310, an electronic device 320, a first external electronic device 330, and/or a second external electronic device 340.

According to certain embodiments of the disclosure, the electronic device 320 may configure a route of a packet such that a packet transmitted by the first external electronic device 330 and/or the second external electronic device 340 connected to the electronic device 320 can be delivered to a predetermined destination (e.g., the external server 310). For example, the electronic device 320 may include a variety of electronic devices capable of serving as a router configured to connect the network 300 to other networks (not shown).

According to certain embodiments of the disclosure, the electronic device 320 may perform a series of operations for allocating IP addresses of the first external electronic device 330 and/or the second external electronic device 340. The first external electronic device 330 and/or the second external electronic device 340 may transmit or receive data to or from the external server 310 via an IP address allocated through a series of operations with the electronic device 320. The IP address allocated to the first external electronic device 330 and/or the second external electronic device 340 may be an IPv6-based IP address. A specific embodiment in which an IP address is allocated to the first external electronic device 330 and/or the second external electronic device 340 will be described later with reference to FIG. 4.

According to certain embodiments of the disclosure, the first external electronic device 330 and/or the second external electronic device 340 may generate a link local address that is an address usable within the network 300 and may communicate with the electronic device 320 via the link local address. The first external electronic device 330 and/or the second external electronic device 340 may exchange data with entities (e.g., the external server 310) outside the network 300 via an IP address allocated through a series of operations with the electronic device 320.

According to certain embodiments of the disclosure, the first external electronic device 330 and/or the second external electronic device 340 may store an address usable within the network, and an IP address usable for exchanging data with entities outside the network. An IP address corresponding to the first external electronic device 330 and an IP address corresponding to the second external electronic device 340 may be different from each other.

Figure 4:
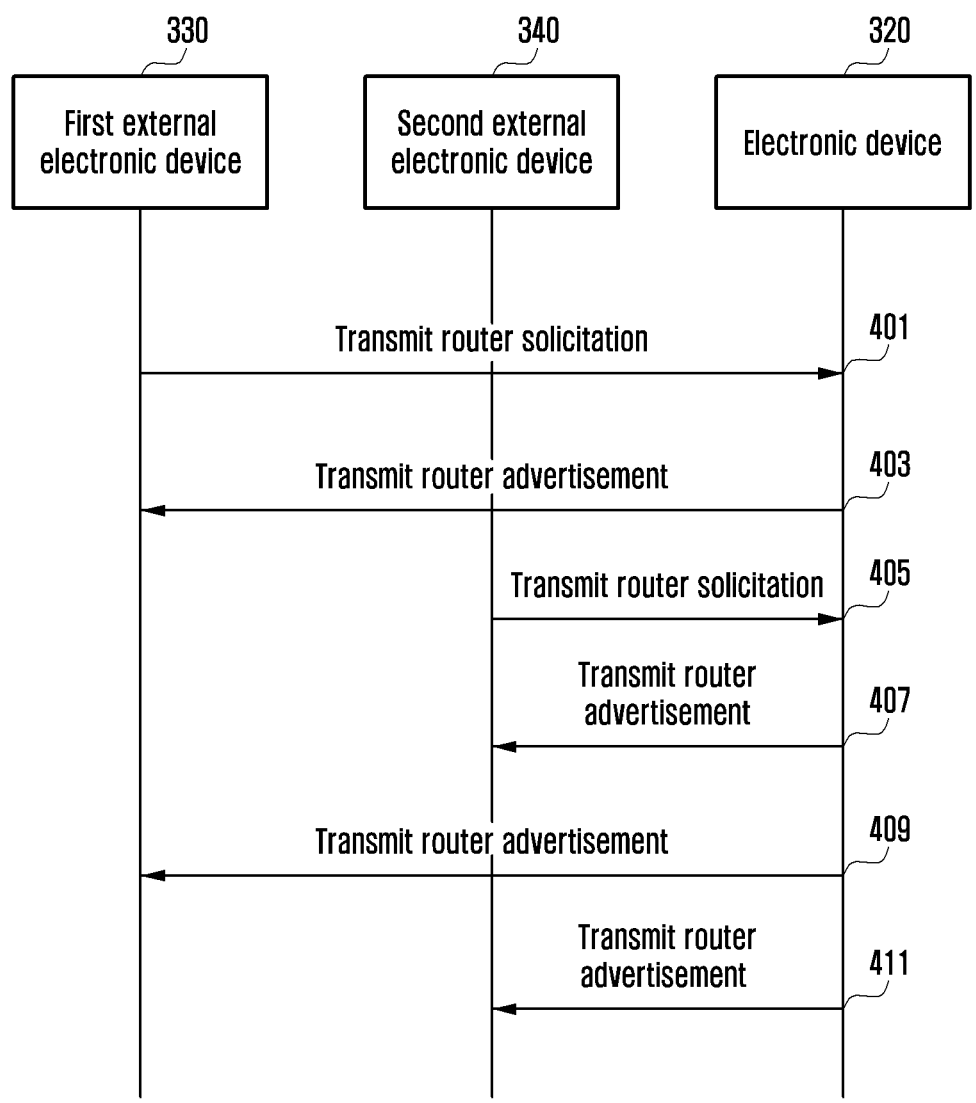
FIG. 4 illustrates an embodiment in which an electronic device allocates an IP of a first external electronic device and an IP of a second external electronic device according to certain embodiments of the disclosure.

FIG. 4 illustrates an embodiment in which an electronic device allocates an IP of a first external electronic device and an IP of a second external electronic device according to certain embodiments of the disclosure.

According to certain embodiments of the disclosure, the first external electronic device 330 may transmit a router solicitation to the electronic device 320 in operation 401.

According to certain embodiments of the disclosure, the electronic device 320 may activate a bridge mode (or IP Passthrough mode) in which an IP address usable for performing data communication with entities outside the network 300 can be allocated to the external electronic device (e.g., the first external electronic device 330 and/or the second external electronic device 340).

According to certain embodiments of the disclosure, before the first external electronic device 330 transmits a router solicitation, the first external electronic device 330 may generate a link local address (LLA) and attempt identification of the presence or absence of other external electronic devices using the same link local address as the generated link local address.

The first external electronic device 330 may transmit a router solicitation including identification information of the first external electronic device 330 and the generated link local address to the electronic device 320. The identification information of the first external electronic device 330 may include various information for distinguishing the first external electronic device 330 from other electronic devices. For example, the identification information of the first external electronic device 330 may include a media access control (MAC) address of the first external electronic device 330.

According to certain embodiments of the disclosure, the IP address request message transmitted by the first external electronic device 330 may refer to a router solicitation (RS) message.

According to certain embodiments of the disclosure, in operation 403, the electronic device 320 may transmit a router advertisement to the first external electronic device 330 after reception of the router solicitation. The router advertisement may include information utilized by the first external electronic device 330 to generate an IP address (e.g., global address) for communication with entities outside the network. The information for generating an IP address may include IPv6 prefix information and/or a hop limit. The router advertisement may include identification information of the first external electronic device 330, identification information of the electronic device 320, and/or a link local address of the electronic device 320.

According to certain embodiments of the disclosure, the response message may refer to a router advertisement (RA) message.

According to certain embodiments of the disclosure, the first external electronic device 330 may generate an IP address, based on information for generating an IP address, included in the router advertisement, and may communicate with entities outside the network 300 by using the IP address.

According to certain embodiments of the disclosure, the second external electronic device 340 may transmit a router solicitation to the electronic device 320 in operation 405.

According to certain embodiments of the disclosure, before the second external electronic device 340 transmits a router solicitation, the second external electronic device 340 may generate a link local address (LLA) and identify the presence or absence of other external electronic devices using the same local link address as the generated local link address.

The second external electronic device 340 may transmit a router solicitation including identification information of the second external electronic device 340 and the generated link local address to the electronic device 320. The identification information of the second external electronic device 340 may include various pieces of information for distinguishing the second external electronic device 340 from other electronic devices. For example, the identification information of the second external electronic device 340 may include a media access control (MAC) address of the second external electronic device 340.

According to certain embodiments of the disclosure, the IP address request message transmitted by the second external electronic device 340 may refer to a router solicitation (RS) message.

According to certain embodiments of the disclosure, in operation 407, the electronic device 320 may transmit a router advertisement to the second external electronic device 340 according to reception of the router solicitation. The router advertisement may include information for the second external electronic device 340 to generate an IP address (e.g., global address) for communication with entities outside the network. The information for generating an IP address may include IPv6 prefix information and/or a hop limit. The router advertisement may include identification information of the second external electronic device 340, identification information of the electronic device 320, and/or a link local address of the electronic device 320.

According to certain embodiments of the disclosure, the response message may refer to a router advertisement (RA) message.

According to certain embodiments of the disclosure, the second external electronic device 340 may generate an IP address, based on information for generating an IP address, included in the router advertisement, and may communicate with entities outside the network 300 by using the IP address.

According to certain embodiments of the disclosure, the electronic device 320 may broadcast the router advertisement (e.g., RA message) in response to satisfying a predetermined condition. The predetermined condition may include a condition related to renewal of an IP address or a condition related to expiration of a predetermined time. In operation 409, the electronic device 320 may transmit a router advertisement including information for renewing an IP address to the first external electronic device 330, and in operation 411, may transmit a router advertisement including information for renewing an IP address to the second external electronic device 340.

Referring to the embodiment shown in FIG. 4, the electronic device 320 may transmit a router advertisement to all electronic devices (e.g., the first external electronic device 330 and/or the second external electronic device 340) that have transmitted a router solicitation. In a bridge mode of the electronic device 320, the number of external electronic devices (e.g., the first external electronic device 330 and/or the second external electronic device 340) that can be connected to the electronic device 320 may be limited. According to an embodiment, in a situation in which the number of external electronic devices connectable to the electronic device 320 should be set to one while the bridge mode is activated, the electronic device 320 may transmit a router advertisement to the first external electronic device 330 and the second external electronic device 340. A situation in which both the first external electronic device 330 and the second external electronic device 340 are connected to the electronic device 320 may occur according to reception of the router advertisement. Hereinafter, an embodiment in which the electronic device 320 is prevented from being connected to all external electronic devices in the bridge mode will be described.

Figure 5A:
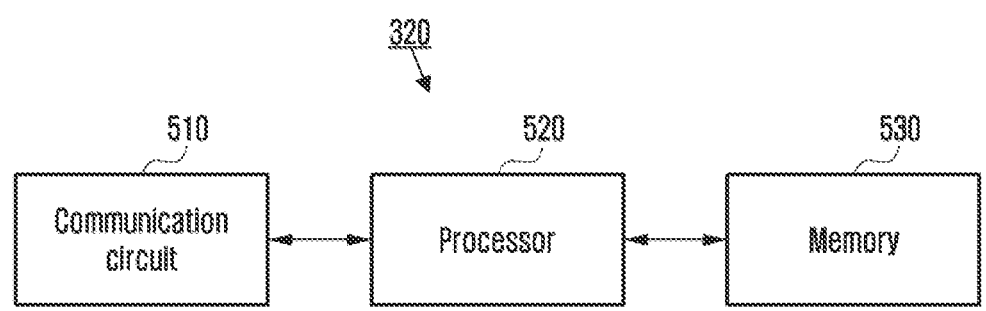
FIG. 5A is a block diagram of an electronic device according to certain embodiments of the disclosure.

FIG. 5A is a block diagram of an electronic device according to certain embodiments of the disclosure.

Referring to FIG. 5A, the electronic device 320 (e.g., the electronic device 101 of FIG. 1) according to certain embodiments of the disclosure may include a communication circuit 510 (e.g., the wireless communication module 192 of FIG. 1), a processor 520 (e.g., the processor 120 of FIG. 1), and/or a memory 530 (e.g., the memory 130 of FIG. 1).

According to certain embodiments of the disclosure, the communication circuit 510 may perform data communication with entities (e.g., the external server 310 of FIG. 3) outside the network (e.g., the network 300 of FIG. 3). The communication circuit 510 may receive an IP address available for the electronic device 320 and various external electronic devices (e.g., the first external electronic device 330 and/or the second external electronic device 340 of FIG. 3) connected to the electronic device 320 from a communication service provider.

According to certain embodiments of the disclosure, the communication circuit 510 may be connected to entities (e.g., the first external electronic device 330 and/or the second external electronic device 340) within the network 300 to exchange data therewith. A communication scheme (e.g., cellular communication) used for connection to an entity outside the network 300 and a communication scheme (e.g., short-range wireless communication including Wi-Fi and Bluetooth) used for connection to an entity within the network 300 may be different from each other. Although the communication circuit 510 is illustrated as one integrated component, the communication circuit 510 may be implemented as a plurality of communication circuits according to a communication scheme. For example, the communication circuit 510 may include a communication circuit configured to support a cellular communication, and a circuit configured to support a short-range wireless communication.

According to certain embodiments of the disclosure, the processor 520 may obtain identification information of an external electronic device to which an IP address for communication with an entity outside the network 300 can be allocated.

According to an embodiment, the processor 520 may activate a bridge mode (or IP Passthrough mode) in which an IP address usable by entities outside the network 300 to perform data communication can be allocated to the external electronic device (e.g., the first external electronic device 330 and/or the second external electronic device 340).

According to an embodiment, the processor 520 may receive a user input for selecting at least one capable of performing the bridge mode, among the external electronic devices (e.g., the first external electronic device 330 and/or the second external electronic device 340 of FIG. 3) connected through the communication circuit 510 and may store identification information of the selected external electronic devices in the memory 530. For convenience of description, an assumption is made that, among the first external electronic device 330 and/or the second external electronic device 340 connected to the electronic device 320, the first external electronic device 330 is an electronic device to which an IP address for communication with an entity outside the network 300 can be allocated, and the second external electronic device 340 is an electronic device to which an IP address for communication with the entity outside the network 300 cannot be allocated.

According to certain embodiments of the disclosure, the memory 530 may store identification information of one or more external electronic devices to which an IPv6-based IP address can be allocated. The memory 530 may map and store identification information of the external electronic devices and link local addresses of the external electronic devices. According to an embodiment, identification information of the external electronic devices and the link local addresses of the external electronic devices may be stored in the memory 530 in a table format.

According to certain embodiments of the disclosure, the processor 520 may receive a router solicitation message including a link local address generated by the first external electronic device 330 and identification information of the first external electronic device 330 through the communication circuit 510. The first external electronic device 330 may transmit a router solicitation to the electronic device 320 to enter the network 300 for the first time.

According to certain embodiments of the disclosure, in response to reception of the router solicitation, the processor 520 may determine whether to transmit a router advertisement, based on the identification information of the first external electronic device 330 included in the router solicitation. The processor 520 may confirm whether the identification information of the first external electronic device 330 included in the router solicitation is stored in the memory 530. When the identification information of the first external electronic device 330 is stored in the memory 530, the first external electronic device 330 may be an electronic device to which an IP address for communication with an entity outside the network 300 can be allocated.

According to certain embodiments of the disclosure, the processor 520 may control the communication circuit 510 such that a router advertisement message including information related to generation of an IP address is transmitted to the first external electronic device 330, based on the identification information of the first external electronic device 330 being stored in the memory 530.

The router advertisement may include information for the first external electronic device 330 to generate an IP address (e.g., global address) for communication with entities outside the network. The information for generating an IP address may be various information including IPv6 prefix information and/or a hop limit. The router advertisement may include identification information of the first external electronic device 330, identification information of the electronic device 320, and/or a link local address of the electronic device 320.

According to certain embodiments of the disclosure, the first external electronic device 330 may generate an IP address, based on the information for generating an IP address included in the router advertisement, and communicate with entities outside the network 300 by using the IP address.

According to certain embodiments of the disclosure, the processor 520 may receive the router solicitation and store a link local address of the first external electronic device 330 included in the router solicitation in the memory 530. The processor 520 may transmit a router advertisement to the first external electronic device 330 via the link local address in response to satisfying a predetermined condition.

According to certain embodiments of the disclosure, the predetermined condition may include a condition related to renewal of an IP address or a condition related to expiration of a predetermined time. According to an embodiment, when the predetermined time expires, the processor 520 may determine that the predetermined condition is satisfied and may transmit a router advertisement to the first external electronic device 330 via the link local address. The first external electronic device 330 may renew the IP address, based on the information related to generation of the IP address, included in the router advertisement. According to an embodiment, when the processor 520 receives information instructing initiation of renewal of the IP address from the external server, the processor 520 may determine that the predetermined condition is satisfied, and transmit a router advertisement via the link local address to the first external electronic device 330. The first external electronic device 330 may renew the IP address, based on information related to generation of the IP address, included in the router advertisement. The router advertisement may be transmitted in a unicasting format, rather than in a broadcasting format.

According to certain embodiments of the disclosure, the processor 520 may receive a router solicitation message including a link local address generated by the second external electronic device 340 and identification information of the second external electronic device 340 through the communication circuit 510.

According to certain embodiments of the disclosure, in response to reception of the router solicitation, the processor 520 may determine whether to transmit a router advertisement, based on the identification information of the second external electronic device 340 included in the router solicitation. The processor 520 may confirm whether identification information of the second external electronic device 340 included in the router solicitation is stored in the memory 530. When the identification information of the second external electronic device 340 is not stored in the memory 530, the second external electronic device 340 may be an electronic device to which an IP address cannot be allocated for communication with an entity outside the network 300.

According to certain embodiments of the disclosure, the processor 520 may not transmit (e.g., omit transmission of) a router advertisement message including information related to generation of an IP address to the second external electronic device 340, based on detecting that the identification information of the second external electronic device 340 is not stored in the memory 530. Alternatively, the processor 520 may ignore the router solicitation transmitted by the second external electronic device 340, based on the identification information of the second external electronic device 340 not being stored in the memory 530.

Due to the failure to receive a router advertisement, the second external electronic device 340 cannot identify information related to generation of an IP address, and thus may not generate an IP address for communication with an entity outside the network 300.

As in the above-described embodiment, among external electronic devices which have transmitted a router solicitation, the electronic device 320 may transmit a router advertisement to the external electronic device (e.g., the first external electronic device 330) that has transmitted a router solicitation including the identification information of the external electronic device, which is stored in the memory 530, and may not transmit a router advertisement to another external electronic device (e.g., the second external electronic device 340) that has transmitted a router solicitation which omits the identification information of the external electronic device, which is stored in the memory 530. Accordingly, the electronic device 320 can be prevented from being connected to the predetermined number (e.g., one) of external electronic devices (e.g., the first external electronic device 330 and the second external electronic device 340) or more in the bridge mode.

Figure 5B:
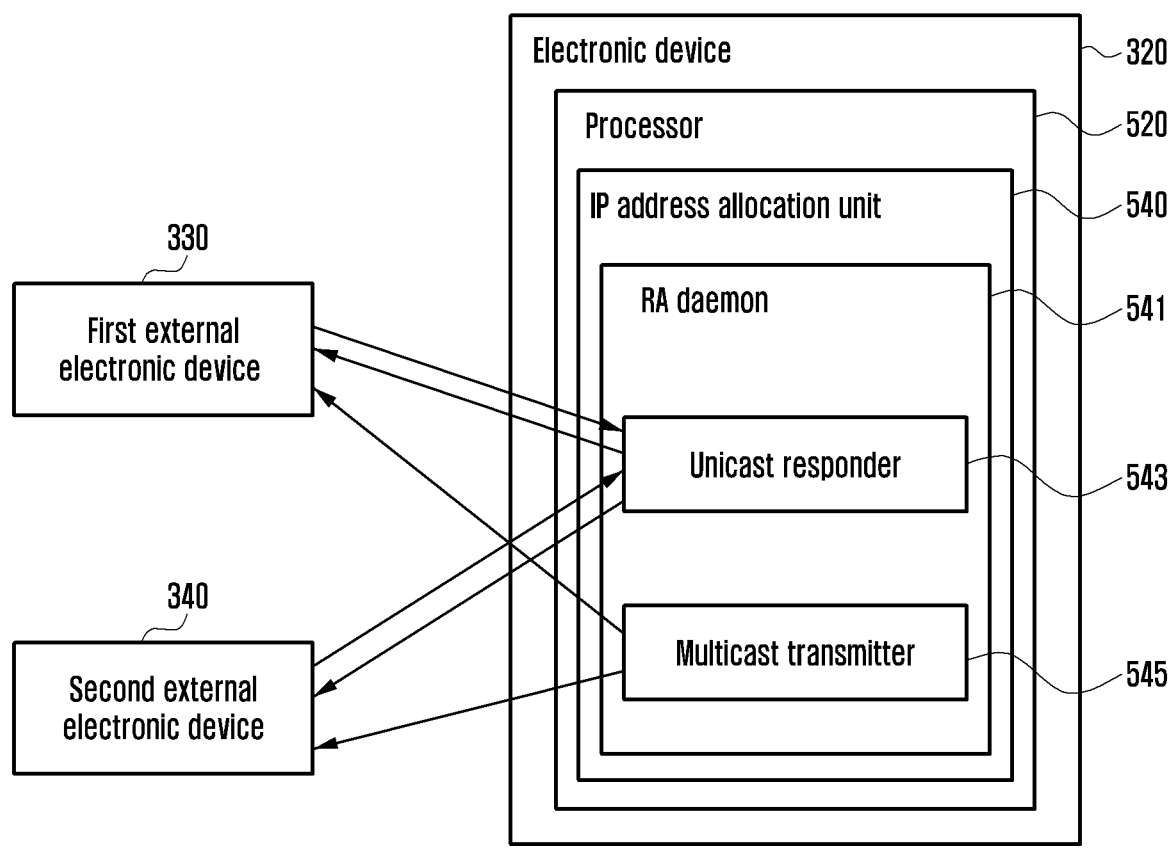
FIG. 5B illustrates an embodiment in which an electronic device transmits a router advertisement when a bridge mode is deactivated, according to certain embodiments of the disclosure.

FIG. 5B illustrates an embodiment in which an electronic device transmits a router advertisement when a bridge mode is deactivated, according to certain embodiments of the disclosure.

According to certain embodiments of the disclosure, the processor (e.g., the processor 520 of FIG. 5A) may include an IP address allocation unit 540 configured to allocate an IP address. The IP address allocation unit 540 may allocate an IPv4-based IP address and/or an Ipv6-based IP address to an external electronic device (e.g., the first external electronic device 330 and/or the second external electronic device 340 of FIG. 3) connected to the electronic device 320.

According to certain embodiments of the disclosure, the IP address allocation unit 540 may include an RA daemon 541 capable of allocating an Ipv6-based IP address to the first external electronic device 330 and/or the second external electronic device 340. The RA daemon 541 may include a unicast responder 543 configured to receive a router solicitation transmitted by the first external electronic device 330 and/or the second external electronic device 340 and transmit a router advertisement corresponding to the router solicitation, and a multicast transmitter 545 configured to broadcast the router advertisement in response to detecting satisfaction of a predetermined condition.

The first external electronic device 330 may transmit a router solicitation including a generated link local address and identification information of the first external electronic device 330 to the electronic device 320. The identification information of the first external electronic device 330 may serve to at least distinguish the first external electronic device 330 from other electronic devices. For example, the identification information of the first external electronic device 330 may include a media access control (MAC) address of the first external electronic device 330.

According to certain embodiments of the disclosure, the IP address request message transmitted by the first external electronic device 330 may refer to a router solicitation (RS) message.

According to certain embodiments of the disclosure, the unicast responder 543 may receive a router solicitation transmitted by the first external electronic device 330 and transmit a router advertisement corresponding to the router solicitation to the first external electronic device 330. The response message may refer to a router advertisement (RA) message.

According to certain embodiments of the disclosure, the first external electronic device 330 may generate an IP address, based on information for generating an IP address included in the router advertisement, and may communicate with entities outside the network 300 by using the IP address.

According to certain embodiments of the disclosure, the second external electronic device 340 may transmit a router solicitation including a link local address and identification information of the second external electronic device 340 to the electronic device 320. The identification information of the second external electronic device 340 may serve to distinguish the second external electronic device 340 from other electronic devices. For example, the identification information of the second external electronic device 340 may include a media access control (MAC) address of the second external electronic device 340.

According to certain embodiments of the disclosure, the IP address request message transmitted by the second external electronic device 340 may refer to a router solicitation (RS) message.

According to certain embodiments of the disclosure, the unicast responder 543 may transmit a router advertisement to the second external electronic device 340 according to reception of the router solicitation.

According to certain embodiments of the disclosure, the multicast responder 545 may broadcast a router advertisement (e.g., RA message) in response to detecting satisfaction of a predetermined condition. The predetermined condition may include a condition related to renewal of an IP address or a condition related to expiration of a predetermined time. The multicast responder 545 may transmit a router advertisement including information for renewing the IP address to the first external electronic device 330, and may transmit a router advertisement including information for renewing the IP address to the second external electronic device 340 in operation 411.

Figure 5C:
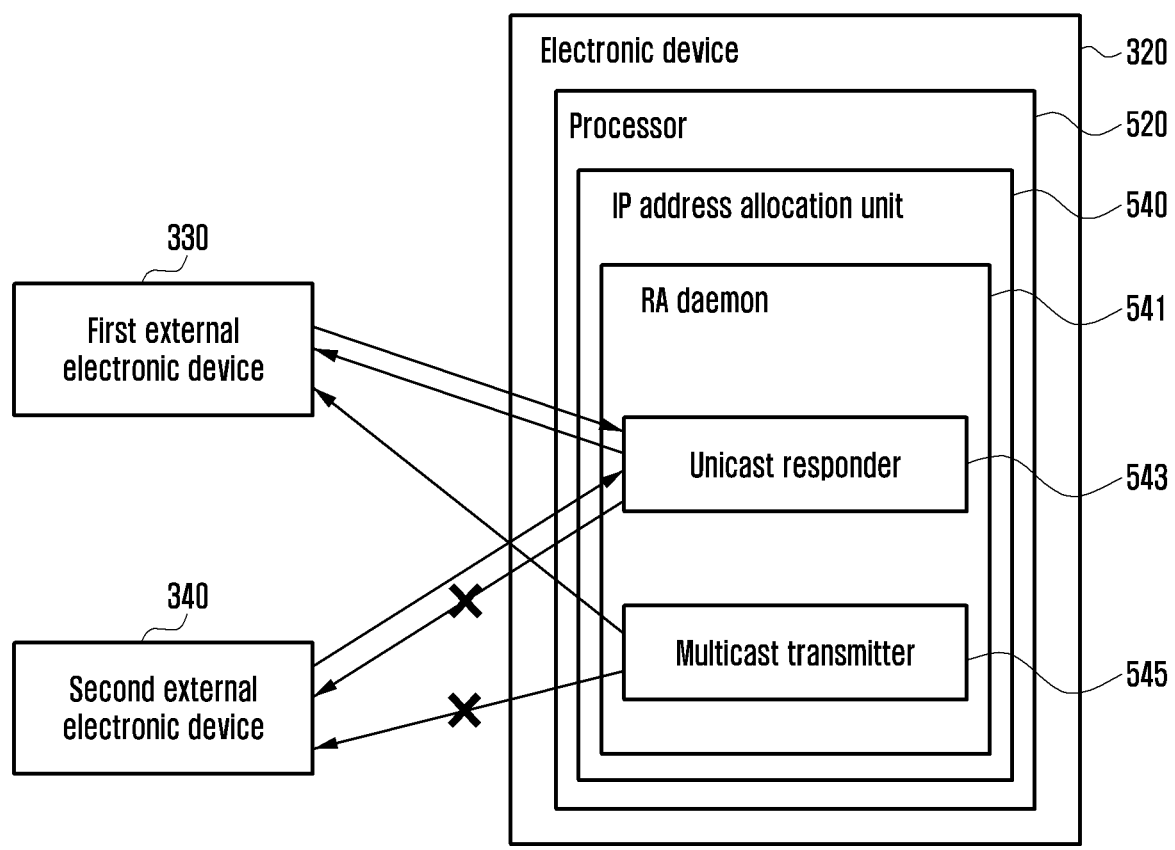
FIG. 5C illustrates an embodiment in which an electronic device transmits a router advertisement when a bridge mode is activated, according to certain embodiments of the disclosure.

FIG. 5C illustrates an embodiment in which an electronic device transmits a router advertisement when a bridge mode is activated, according to certain embodiments of the disclosure. According to certain embodiments of the disclosure, the first external electronic device 330 may transmit a router solicitation including a generated link local address and identification information of the first external electronic device 330 to the electronic device 320. The identification information of the first external electronic device 330 may include various information for distinguishing the first external electronic device 330 from other electronic devices. For example, the identification information of the first external electronic device 330 may include a media access control (MAC) address of the first external electronic device 330.

According to certain embodiments of the disclosure, the IP address request message transmitted by the first external electronic device 330 may refer to a router solicitation (RS) message.

According to certain embodiments of the disclosure, the unicast responder 543 may receive the router solicitation transmitted by the first external electronic device 330 and may determine whether to transmit a router advertisement, based on the identification information of the first external electronic device 330 included in the router solicitation. The unicast responder 543 may confirm whether the identification information of the first external electronic device 330 included in the router solicitation is stored in the memory 530. When the identification information of the first external electronic device 330 is stored in the memory 530, the first external electronic device 330 may be an electronic device to which an IP address for communication with an entity outside the network 300 can be allocated.

The unicast responder 543 may control the communication circuit 510 such that a router advertisement message including information related to generation of an IP address is transmitted to the first external electronic device 330, based on the identification information of the first external electronic device 330 stored in the memory 530.

The router advertisement may include information utilized by the first external electronic device 330 to generate an IP address (e.g., global address) for communication with entities outside the network. The information for generating the IP address may include IPv6 prefix information and/or a hop limit. The router advertisement may include identification information of the first external electronic device 330, identification information of the electronic device 320, and/or a link local address of the electronic device 320.

According to certain embodiments of the disclosure, the first external electronic device 330 may generate an IP address, based on information for generating an IP address included in the router advertisement and may communicate with entities outside the network 300 by using the IP address.

According to certain embodiments of the disclosure, the unicast responder 543 may receive a router solicitation message including a link local address generated by the second external electronic device 340 and identification information of the second external electronic device 340. The unicast responder 543 may determine whether to transmit a router advertisement, based on the identification information of the second external electronic device 340 included in the router solicitation, in response to receiving the router solicitation. The unicast responder 543 may confirm whether the identification information of the second external electronic device 340 included in the router solicitation is stored in the memory 530. When the identification information of the second external electronic device 340 is not stored in the memory 530, the second external electronic device 340 may be determined to be an electronic device to which an IP address cannot be allocated for communication with an entity outside the network 300.

The unicast responder 543 may not transmit a router advertisement message including information related to generation of an IP address to the second external electronic device 340, based on the determination that the identification information of the second external electronic device 340 is not stored in the memory 530. Alternatively, the processor 520 may ignore the router solicitation transmitted by the second external electronic device 340, based on the determination that the identification information of the second external electronic device 340 is not stored in the memory 530.

According to certain embodiments of the disclosure, the unicast responder 543 may receive the router solicitation and store the link local address of the first external electronic device 330 included in the router solicitation in the memory 530. The multicast responder 545 may transmit the router advertisement to the first external electronic device 330 via the stored link local address according to detecting satisfaction of a predetermined condition. The multicast responder 545 may not transmit the router advertisement to the second external electronic device 340 by using the link local address of the second external electronic device 340 rather than the stored link local address. The second external electronic device 340 may not receive a router advertisement while the bridge mode is activated on the electronic device 320, and the electronic device 320 may not allocate an IP address to the second external electronic device 340.

Figure 6A:
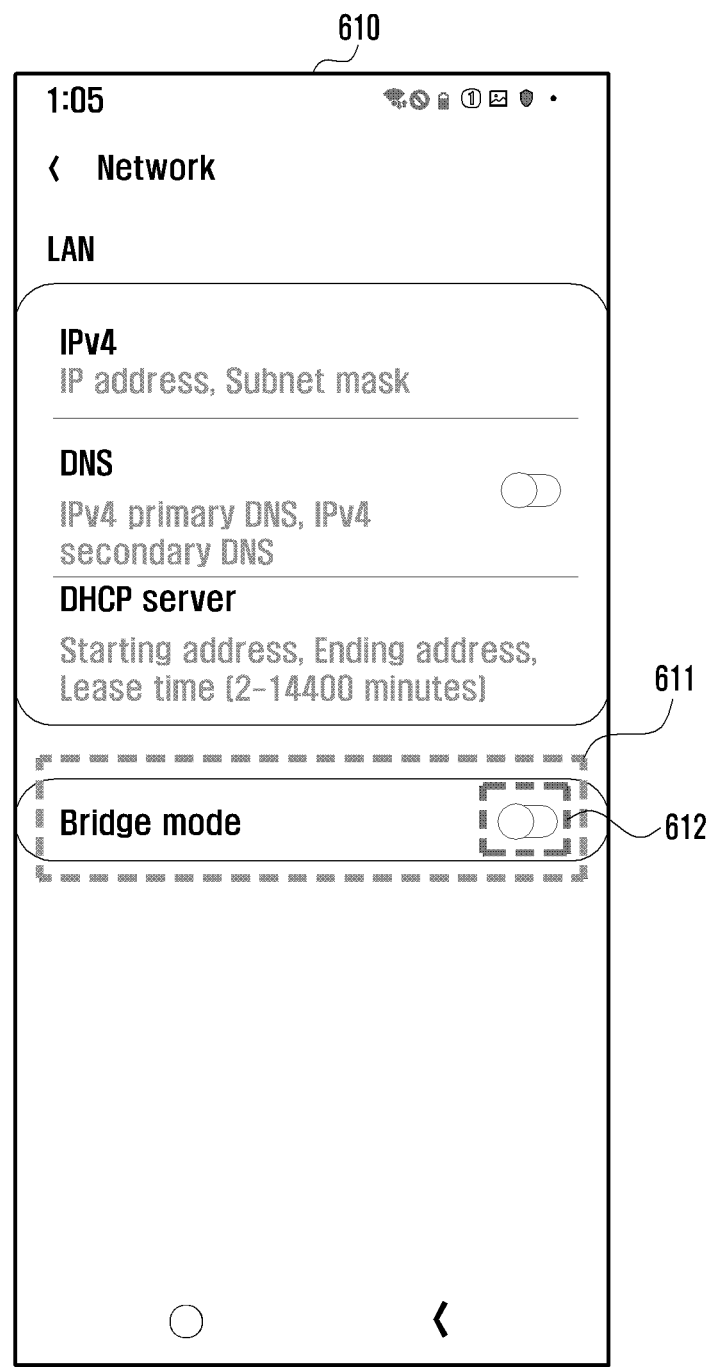
FIGS. 6A, 6B, and 6C illustrate an embodiment in which an authorized external electronic to which an IP address is to be allocated is selected in an electronic device according to certain embodiments of the present disclosure.
Figure 6B:
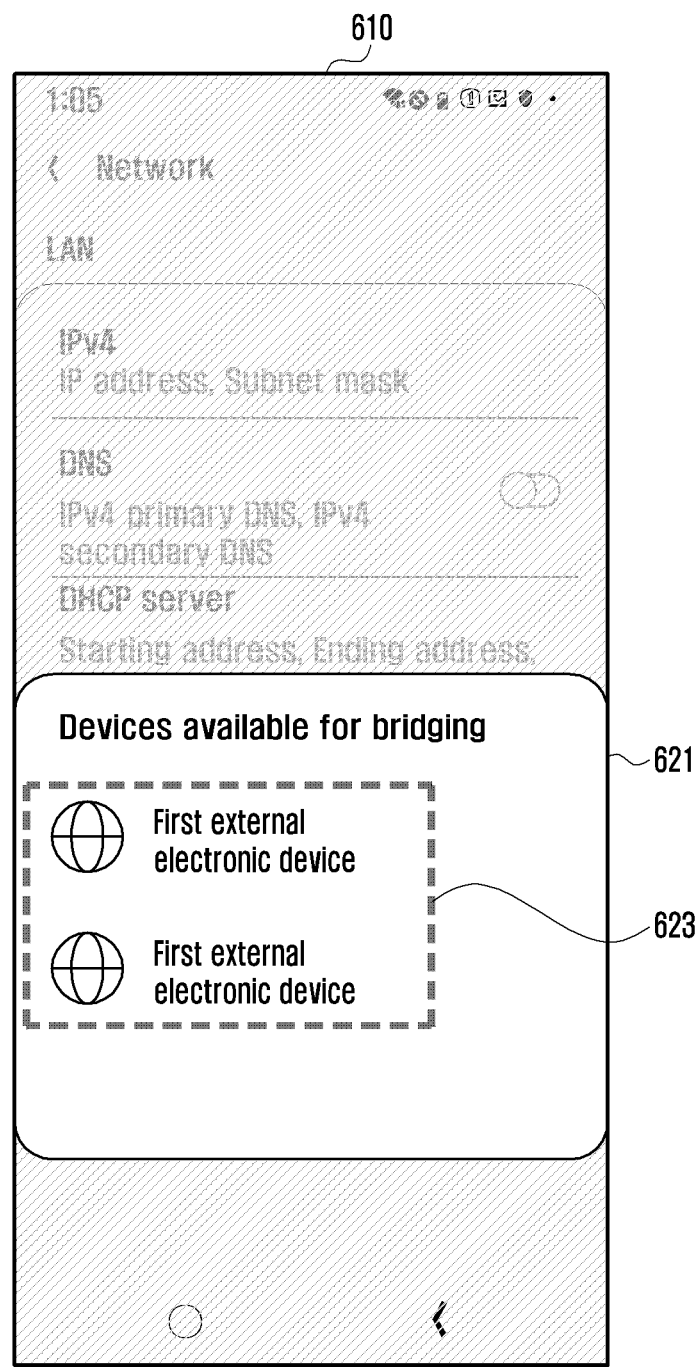
Figure 6C:
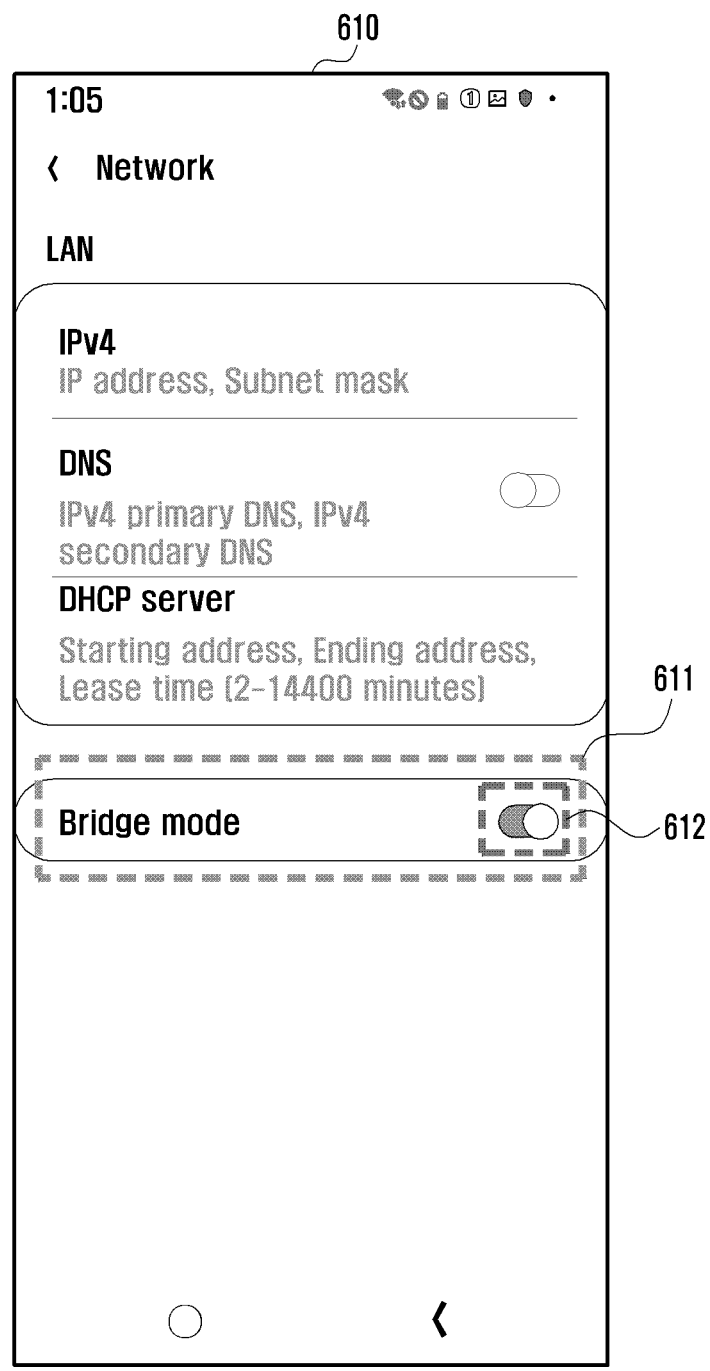

FIGS. 6A, 6B, and 6C illustrate an embodiment in which an authorized external electronic device to which an IP address is to be allocated is selected in an electronic device according to certain embodiments of the present disclosure.

According to certain embodiments of the disclosure, the electronic device (e.g., the electronic device 320 of FIG. 3) may further include a display (e.g., the display module 160 of FIG. 1) capable of displaying various screens.

Referring to FIG. 6A, the electronic device 320 may display, on the display 160, a user interface 610 including selectable toggles for activating and deactivating the bridge mode (or IP Passthrough mode) on the display 160. In the user interface 610, the bridge mode may refer to a mode in which an external electronic device (e.g., the first external electronic device 320 of FIG. 3) connected to the electronic device 320 provides, to an external electronic device, an IP address allowing the entity outside the network 300 to directly communicate with the first external electronic device 330, rather than a link local address.

The user interface 610 may include a region 611 indicating whether the bridge mode is activated, and a region 612 for receiving a user input toggling activation of the bridge mode. The electronic device 320 may perform activation or deactivation of the bridge mode, based on a user input to the region 612 capable of receiving a user input. The region 621 capable of receiving a user input may indicate that the bridge mode is deactivated.

According to activation of the bridge mode, the electronic device 320 may receive a user input for selecting at least one of the external electronic devices (e.g., the first external electronic device 330 and/or the second external electronic device 340 of FIG. 3) connected thereto through the communication circuit 510 and may store identification information of the selected external electronic devices in the memory 530.

Referring to FIG. 6B, according to activation of the bridge mode, the electronic device 320 may display, on the display 160, the screen 621 for selecting an electronic device to which an IP address for communication with an entity outside the network 300 can be allocated, among external electronic devices connected thereto through the communication circuit 510. The screen 621 may include a list 623 of external electronic devices connected to the electronic device 320. The screen 621 may be displayed on the user interface 610 by overlay on, for example, other underlying UI layers (e.g., as shown by the example screen 610). The electronic device 320 may receive a user input selecting at least one external electronic device (e.g., the first external electronic device 330) on the screen 621 and may store identification information of the first external electronic device 330 in the memory 530.

Referring to FIG. 6C, the user interface 610 may include a region 611 indicating whether the bridge mode is activated and a region 612 for receiving a user input toggling activation and deactivation of the bridge mode. When the activation of the bridge mode is toggled on, the region 612 may visually represent the activation of the bridge mode (e.g., by moving visual toggle icon rightwards within the toggle's movement field, and filling in the space from which it moved).

Figure 7:
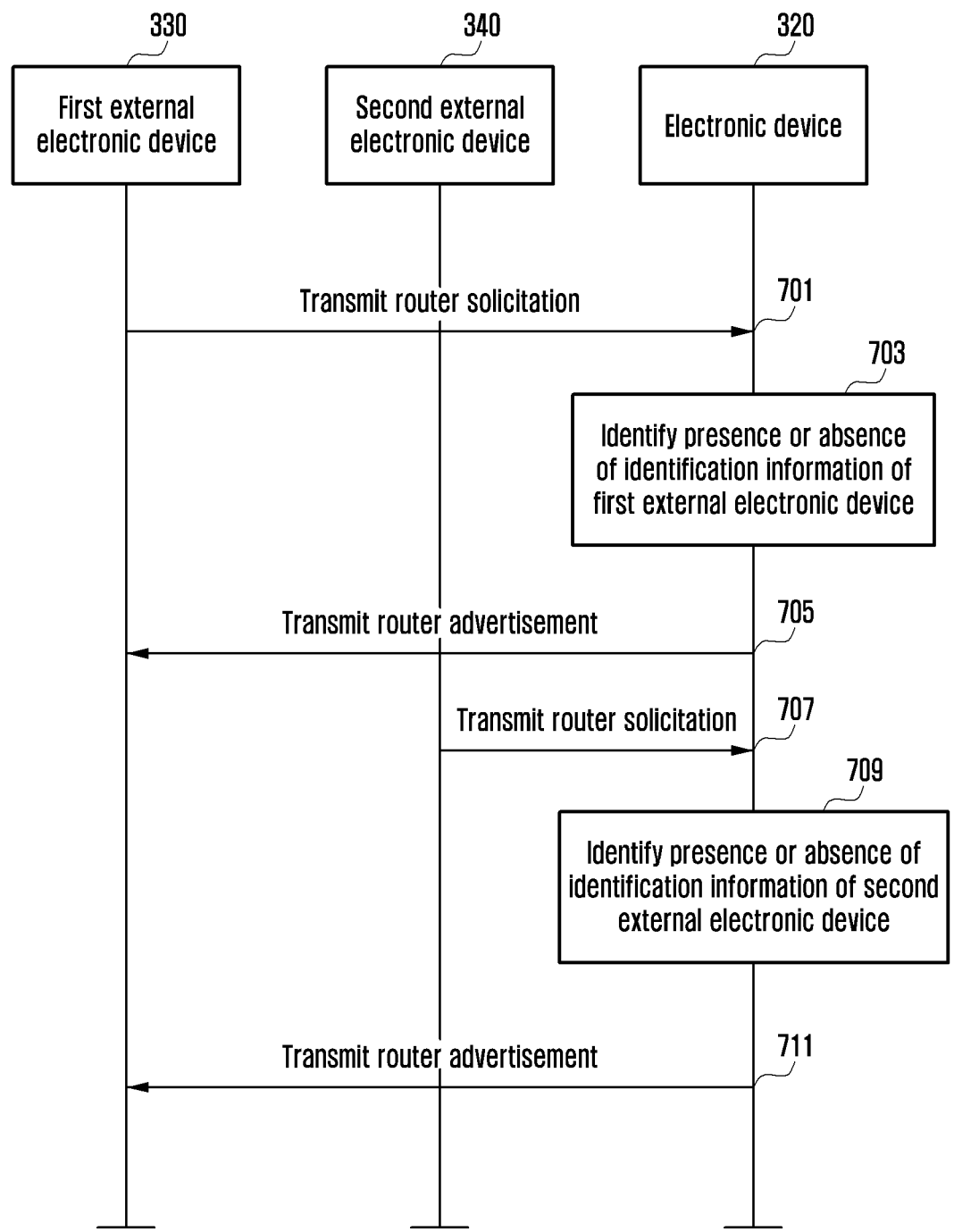
FIG. 7 illustrates an embodiment in which an electronic device allocates an IP of a first external electronic device and an IP of a second external electronic device, according to certain embodiments of the disclosure.

FIG. 7 illustrates an embodiment in which an electronic device allocates an IP of a first external electronic device and an IP of a second external electronic device, according to certain embodiments of the disclosure.

According to certain embodiments of the disclosure, the first external electronic device (e.g., the first external electronic device 330 of FIG. 3) may transmit a router solicitation to the electronic device 320 in operation 701.

According to certain embodiments of the disclosure, before the first external electronic device 330 transmits a router solicitation, the first external electronic device 330 may generate a link local address (LLA) and identify the presence or absence of other external electronic devices using the same local link address as the generated local link address.

The first external electronic device 330 may transmit a router solicitation including the generated link local address and identification information of the first external electronic device 330 to the electronic device 320. The identification information of the first external electronic device 330 may include various information for distinguishing the first external electronic device 330 from other electronic devices. For example, the identification information of the first external electronic device 330 may include a media access control (MAC) address of the first external electronic device 330.

According to certain embodiments of the disclosure, the IP address request message transmitted by the first external electronic device 330 may refer to a router solicitation (RS) message.

According to certain embodiments of the disclosure, in operation 703, the electronic device (e.g., the electronic device 320 of FIG. 3) may confirm whether the identification information of the first external electronic device 330 included in the router solicitation is stored in the memory (e.g., the memory 530 of FIG. 5A).

According to certain embodiments of the disclosure, the memory 530 may store identification information of one or more external electronic devices to which an IPv6-based IP address can be allocated. The memory 530 may map and store the identification information of the external electronic devices and the link local addresses of the external electronic devices. According to an embodiment, the identification information of the external electronic devices and the link local addresses of the external electronic devices may be stored in the memory 530 in a table form.

According to certain embodiments of the disclosure, in response to reception of the router solicitation, the electronic device 320 may determine whether to transmit a router advertisement, based on the identification information of the first external electronic device 330 included in the router solicitation. The electronic device 320 may confirm whether the identification information of the first external electronic device 330 included in the router solicitation is stored in the memory 530. When the identification information of the first external electronic device 330 is stored in the memory 530, it may be determined that the first external electronic device 330 may be an electronic device to which an IP address for communication with an entity outside the network 300 can be allocated.

According to certain embodiments of the disclosure, in operation 705, the electronic device 320 may transmit a router advertisement to the first external electronic device 330, based on the identification information of the first external electronic device 330 included in the router solicitation, being stored in the memory 530.

The router advertisement may include information for the first external electronic device 330 to generate an IP address (e.g., global address) for communication with entities outside the network. The information for generating an IP address may include IPv6 prefix information and/or a hop limit. The router advertisement may include identification information of the first external electronic device 330, identification information of the electronic device 320, and/or a link local address of the electronic device 320.

According to certain embodiments of the disclosure, the first external electronic device 330 may generate an IP address, based on the information for generating an IP address included in the router advertisement, and may communicate with entities outside the network 300 by using the IP address.

According to certain embodiments of the disclosure, the second external electronic device (e.g., the second external electronic device 340 of FIG. 3) may transmit a router solicitation to the electronic device 320 in operation 707.

According to certain embodiments of the disclosure, before the second external electronic device 340 transmits a router solicitation, the second external electronic device 340 may generate a link local address (LLA) and identify the presence or absence of other external electronic devices using the same local link address as the generated local link address.

The second external electronic device 340 may transmit a router solicitation including the generated link local address and identification information of the second external electronic device 340 to the electronic device 320. The identification information of the second external electronic device 340 may include various information for distinguishing the second external electronic device 340 from other electronic devices. For example, the identification information of the second external electronic device 340 may include a media access control (MAC) address of the second external electronic device 340.

According to certain embodiments of the disclosure, the IP address request message transmitted by the second external electronic device 330 may refer to a router solicitation (RS) message.

According to certain embodiments of the disclosure, in operation 709, the electronic device 320 may confirm whether the identification information of the second external electronic device 340 is stored in the memory 530.

According to certain embodiments of the disclosure, in response to reception of the router solicitation, the electronic device 320 may determine whether to transmit a router advertisement, based on the identification information of the second external electronic device 340 included in the router solicitation. The electronic device 320 may confirm whether the identification information of the second external electronic device 340 included in the router solicitation is stored in the memory 530. When the identification information of the second external electronic device 340 is not stored in the memory 530, the second external electronic device 340 may be determined to be an electronic device to which an IP address for communication with an entity outside the network 300 cannot be allocated.

According to certain embodiments of the disclosure, the electronic device 320 may not transmit a router advertisement message including information related to generation of an IP address to the second external electronic device 340, based on the identification information of the second external electronic device 340 not being stored in the memory 530. Alternatively, the electronic device 320 may ignore the router solicitation transmitted by the second external electronic device 340, based on the identification information of the second external electronic device 340 not being stored in the memory 530.

Due to the failure to receiving a router advertisement, the second external electronic device 340 may be unable to identify information related to generation of an IP address, and thus may not generate an IP address for communication with an entity outside the network 300.

According to certain embodiments of the disclosure, in operation 711, the electronic device 320 may transmit a router advertisement to the first external electronic device 330 by using the local address information of the first external electronic device 330 stored in the memory 530.

According to certain embodiments of the disclosure, the electronic device 320 may receive a router solicitation and store the link local address of the first external electronic device 330 included in the router solicitation on the memory 530. The electronic device 320 may transmit a router advertisement to the first external electronic device 330 via the link local address according to satisfaction of a predetermined condition.

According to certain embodiments of the disclosure, the predetermined condition may include a condition related to renewal of an IP address or a condition related to expiration of a predetermined time. According to an embodiment, when the predetermined time expires, the electronic device 320 determines that the predetermined condition is satisfied and may transmit a router advertisement to the first external electronic device 330 via the link local address. The first external electronic device 330 may renew the IP address, based on information related to generation of the IP address included in the router advertisement. According to an embodiment, when the electronic device 320 receives information instructing to initiate renewal of the IP address from the external server, the electronic device 320 may determine that the predetermined condition is satisfied and may transmits a router advertisement via the link local address to the first external electronic device. The first external electronic device 330 may renew the IP address, based on the information related to generation of the IP address included in the router advertisement. The router advertisement may be transmitted in a unicasting format rather than in a broadcasting format.

An electronic device according to certain embodiments of the disclosure may include: a memory configured to store identification information of at least one external electronic device to which an IPv6-based IP address can be allocated; a communication circuit; and a processor. The processor may receive, from the external electronic device, a router solicitation including a link local address generated by the external electronic device and identification information of the external electronic device, may confirm whether the identification information of the external electronic device included in the router solicitation is stored in the memory, and may control the communication circuit such that a router advertisement including the information related to generation of the IP address is transmitted to the external electronic device, based on the identification information of the external electronic device being stored in the memory.

In the electronic device according to certain embodiments of the disclosure, the processor may not transmit the router advertisement to the external electronic device, based on the identification information of the external electronic device not being stored in the memory.

In the electronic device according to certain embodiments of the disclosure, the processor may ignore the router solicitation, based on the identification information of the external electronic device not being stored in the memory.

In the electronic device according to certain embodiments of the disclosure, the processor may store, in the memory, the link request address included in the router solicitation and may control the communication circuit such that the router advertisement is transmitted to the external electronic device via the link request address in response to satisfying a predetermined condition.

In the electronic device according to certain embodiments of the disclosure, the processor may control the communication circuit such that the router advertisement is transmitted to the external electronic device in a unicast manner.

In the electronic device according to certain embodiments of the disclosure, the predetermined condition may include a condition related to renewal of the IP address.

In the electronic device according to certain embodiments of the disclosure, the router solicitation may include information indicating that the IP Passthrough mode is activated.

In the electronic device according to certain embodiments of the disclosure, the memory may be configured to store identification information of an authorized external electronic device to which the IPv6-based IP address is to be allocated.

In the electronic device according to certain embodiments of the disclosure, the router solicitation may include a message requesting an IPv6-based IP address.

In the electronic device according to certain embodiments of the disclosure, the identification information of the external electronic device may include a media access control (MAC) address of the external electronic device.

Figure 8:
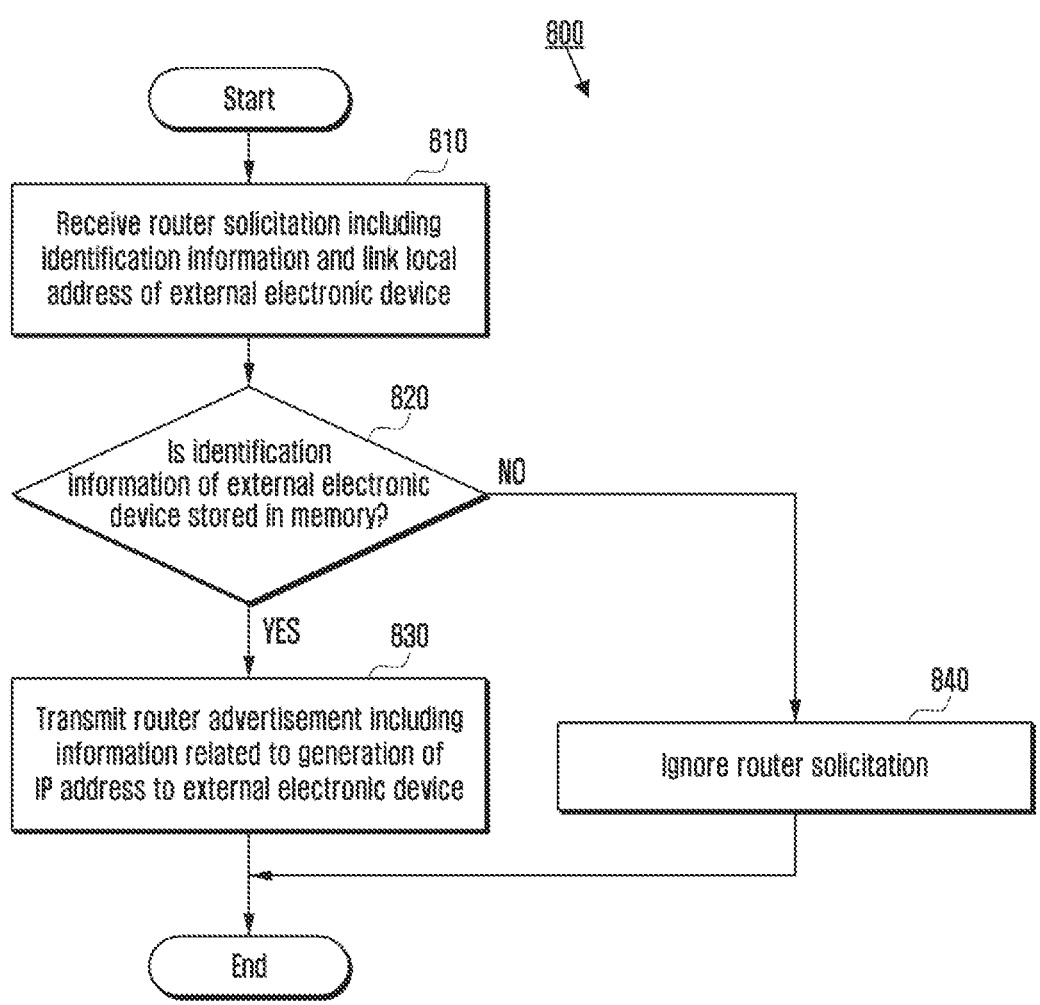
FIG. 8 is an operation flowchart illustrating a method for operating an electronic device according to certain embodiments of the disclosure.

FIG. 8 is an operation flowchart illustrating a method 800 for operating an electronic device according to certain embodiments of the disclosure.

According to certain embodiments of the disclosure, in operation 810, the electronic device (e.g., the electronic device 320 of FIG. 3) may receive, from an external electronic device (e.g., the first external electronic device 330 and/or the second device 340 of FIG. 3), a router solicitation including a link local address and identification information of the external electronic device.

The first external electronic device 330 may transmit a router solicitation including the generated link local address and the identification information of the first external electronic device 330 to the electronic device 320. The identification information of the first external electronic device 330 may include various information for distinguishing the first external electronic device 330 from other electronic devices. For example, the identification information of the first external electronic device 330 may include a media access control (MAC) address of the first external electronic device 330.

According to certain embodiments of the disclosure, the IP address request message transmitted by the first external electronic device 330 may refer to a router solicitation (RS) message.

According to certain embodiments of the disclosure, in operation 820, the electronic device 320 may confirm whether the identification information of the external electronic device included in the router solicitation is stored in a memory (e.g., the memory 530 of FIG. 5A).

According to certain embodiments of the disclosure, the memory 530 may store identification information of one or more external electronic devices to which an IPv6-based IP address can be allocated. The memory 530 may map and store the identification information of the external electronic devices and the link local addresses of the external electronic devices. According to an embodiment, the identification information of the external electronic devices and the link local addresses of the external electronic devices may be stored in the memory 530 in a table form.

According to certain embodiments of the disclosure, in response to reception of the router solicitation, the electronic device 320 may determine whether to transmit a router advertisement, based on the identification information of the external electronic device included in the router solicitation. The electronic device 320 may confirm whether the identification information of the external electronic device included in the router solicitation is stored in the memory 530. When the identification information of the external electronic device is stored in the memory 530, the external electronic device may be an electronic device to which an IP address for communication with an entity outside the network 300 can be allocated. When the identification information of the external electronic device is not stored in the memory 530, the external electronic device may be determined to be an electronic device to which an IP address for communication with an entity outside the network 300 cannot be allocated.

According to certain embodiments of the disclosure, in operation 830, the electronic device 320 may transmit a router advertisement including information related to generation of an IP address to an external electronic device (e.g., the first external electronic device 330 of FIG. 3), based on the identification information of the external electronic device included in the router solicitation, being stored in the memory 530 (operation 820-Y).

The router advertisement may include information for the first external electronic device 330 to generate an IP address (e.g., global address) for communication with entities outside the network. The information for generating the IP address may be various information including IPv6 prefix information and/or a hop limit. The router advertisement may include identification information of the first external electronic device 330, identification information of the electronic device 320, and/or a link local address of the electronic device 320.

According to certain embodiments of the disclosure, the first external electronic device 330 may generate an IP address, based on the information for generating an IP address included in the router advertisement and communicate with entities outside the network 300 by using the IP address.

According to certain embodiments of the disclosure, in operation 840, the electronic device 320 may ignore the router solicitation, based on determining that the identification information of the external electronic device included in the router solicitation is not stored in the memory 530 (operation 820-N).

According to certain embodiments of the disclosure, the electronic device 320 may not transmit a router advertisement message including information related to generation of an IP address to an external electronic device, based on determining that the identification information of the external electronic device is not stored in the memory 530. Alternatively, the electronic device 320 may also ignore the router solicitation transmitted by the second external electronic device 340, based on determining that the identification information of the external electronic device is not stored in the memory 530.

Due to the failure in receiving a router advertisement, the second external electronic device 340 may be unable to identify information related to generation of an IP address, and thus may not generate an IP address for communication with an entity outside the network 300.

A method for operating an electronic device according to certain embodiments of the disclosure may include: receiving, from an external electronic device, a router solicitation including a link local address generated by the external electronic device and identification information of the external electronic device; confirming whether the identification information of the external electronic device included in the router solicitation is stored in a memory; and transmitting a router advertisement including information related to generation of the IP address to the external electronic device, based on the identification information of the external electronic device being stored in the memory.

The method for operating an electronic device according to certain embodiments of the disclosure may further include transmitting no router advertisement to the external electronic device, based on the identification information of the external electronic device not being stored in the memory.

The method for operating an electronic device according to certain embodiments of the disclosure may further include ignoring the router solicitation, based on the identification information of the external electronic device not being stored in the memory.

The method for operating an electronic device according to certain embodiments of the disclosure may further include: storing the link request address included in the router solicitation in the memory; and transmitting the router advertisement to the external electronic device via the link request address in response to satisfying a predetermined condition.

The method of operating an electronic device according to certain embodiments of the disclosure may further include transmitting the router advertisement to the external electronic device in a unicast manner.

In the method for operating an electronic device according to certain embodiments of the disclosure, the predetermined condition may include a condition related to renewal of the IP address.

In the method for operating an electronic device according to certain embodiments of the disclosure, the router solicitation may include information indicating that the IP Passthrough mode is activated.

The method for operating an electronic device according to certain embodiments of the disclosure may further include storing, in the memory, identification information of an authorized external electronic device to which the IPv6-based IP address is to be allocated.

In the method for operating an electronic device according to certain embodiments of the disclosure, the router solicitation may include a message requesting an IPv6-based IP address.

In the method for operating an electronic device according to certain embodiments of the disclosure, the identification information of the external electronic device may include a media access control (MAC) address of the external electronic device.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a memory configured to store identification information of at least one external electronic device to which an Internet Protocol Version 6 (IPv6)-based Internet Protocol (IP) address is allocatable, the IPv6-based IP address being global address;
   a communication circuit; and
   a processor,
   wherein the processor is configured to:
   receive, from the external electronic device, a router solicitation including a link local address generated by the external electronic device, and identification information of the external electronic device,
   store, in the memory, the link local address included in the router solicitation,
   determine whether the identification information of the external electronic device included in the router solicitation is stored in the memory, and
   if the identification information of the external electronic device is stored in the memory:
   control the communication circuit to transmit a router advertisement including information related to generation of the IPv6-based IP address to the external electronic device,
   control the communication circuit to transmit the router advertisement to the external electronic device via the link local address, in response to detecting satisfaction of a predetermined condition, wherein the predetermined condition is related to renewal of the IVv6-based IP address,
   wherein the router advertisement including the information related to generation of the IPv6-based IP address is not transmitted to the external electronic device if the electronic device receives the router solication from the external electronic device and the identification information of the external electronic device is not stored in the memory.

2. The electronic device of claim 1, wherein: based on detecting that the identification information of the external electronic device is absent from storage in the memory, the processor is further configured to ignore the router solicitation.

3. The electronic device of claim 1, wherein the router advertisement is transmitted to the external electronic device in a unicast manner.

4. The electronic device of claim 1, wherein the router solicitation comprises information indicating that an IP pass-through mode is activated.

5. The electronic device of claim 1, wherein the memory further stores identification information of an authorized external electronic device, to which the IPv6-based IP address is to be allocated.

6. The electronic device of claim 1, wherein the router solicitation includes a message requesting an IPv6-based IP address.

7. The electronic device of claim 1, wherein the identification information of the external electronic device includes a media access control (MAC) address of the external electronic device.

8. The electronic device of claim 1, wherein a user input comprises a selection of the at least one external electronic device.

9. A non-transitory computer-readable medium storing a plurality of executable instructions thereon, wherein execution of the plurality of executable instructions by one or more processors in an electronic device causes performance of a plurality of operations, the plurality of operations comprising:
- receiving, from an external electronic device, a router solication including a link local address generated by the external electronic device, and identification information of the external electronic device;
- storing, in a memory, the link local address included in the router soliciation:
  - determining whether the identification information of the external electronic device included in the router soliciation is stored in the memory; and
  - if the identification information of the external electronic device is stored in the memory:
  - controlling a communication circuit to transmit a router advertisement including information related to generation of an IPv6-based IP address to the external electronic device, the IPv6-based IP address being global address,
  - controlling the communication circuit to transmit the router advertisement to the external eletronic device via the link local address in response to detecting satisfaction of a predetermined condition, wherein the predetermined condition is related to renewal of the IPv6-based IP adress,
- wherein the router advertisement including the information related to generation of the IPv6-based IP address is not transmitted to the external electronic device if the electronic device receives the router solicitation from the external electronic device and the identification information of the external electronic device is not stored in the memory.

10. The non-transitory computer-readable medium of claim 9, wherein the plurality of operations further comprises:
- based on detecting that the identification information of the external electronic device is absent from storage in the memory, ignoring the router solicitation.

11. The non-transitory computer-readable medium of claim 9, wherein the router advertisement is transmitted to the external eletronic device in a unicast manner.

12. The non-transitory computer-readable medium of claim 9, wherein the router solicitation includes information indicating that an IP passthrough mode is activated.

13. The non-transitory computer-readable medium of claim 9, wherein the plurality of opertions further comprises:
- storing, in the memory, identification information of an authorized external electronic device to which the IPv6-based IP address is to be allocated.

14. The non-transitory computer-readable medium or claim 9, wherein the router solicitation includes a request for an IPv6-based IP address.

15. The non-transitory computer-readable medium of claim 9, wherein the identification information of the external electronic device includes a media access control (MAC) address of the external electronic device.

* * * * *